United States Patent [19]

Hoffman

[11] Patent Number: 4,758,693
[45] Date of Patent: Jul. 19, 1988

[54] ENCODING SUBSTRATE FOR ROTARY SWITCH ASSEMBLY

[75] Inventor: Norman E. Hoffman, Harrisburg, Pa.

[73] Assignee: AMP Incorporated, Harrisburg, Pa.

[21] Appl. No.: 104,619

[22] Filed: Oct. 1, 1987

[51] Int. Cl.⁴ .................. H01H 9/00; H01H 19/58; H01H 21/78

[52] U.S. Cl. ...................... 200/11 R; 200/11 DA; 200/11 TW

[58] Field of Search ............... 200/11 R, 11 A, 11 D, 200/11 DA, 11 E, 11 EA, 11 G, 11 J, 11 K, 11 TW, 14, 292, 291, 284, 6 B

[56] References Cited

U.S. PATENT DOCUMENTS

| | | | |
|---|---|---|---|
| 3,531,603 | 9/1970 | Ashman | 200/11 G X |
| 3,699,279 | 10/1972 | Lockard et al. | 200/11 G |
| 3,723,674 | 3/1973 | Khitro et al. | 200/11 TW |
| 3,736,390 | 5/1973 | Lockard | 200/11 DA |
| 3,819,886 | 6/1974 | Homan et al. | 200/38 B |
| 4,034,178 | 6/1977 | Koppenheffer et al. | 200/293 |
| 4,196,324 | 4/1980 | Kojima et al. | 200/11 G X |
| 4,267,412 | 5/1981 | Janssen et al. | 200/6 B |
| 4,346,269 | 8/1982 | Slavin et al. | 200/11 DA |
| 4,493,954 | 1/1985 | Kimmel et al. | 200/11 R |
| 4,497,984 | 2/1985 | Ashman et al. | 200/11 DA |
| 4,523,175 | 6/1985 | Sakurai | 338/134 |
| 4,532,152 | 6/1985 | Elarde | 427/96 |
| 4,558,513 | 12/1985 | Buss | 29/622 |
| 4,572,931 | 2/1986 | Shiraishi et al. | 200/11 DA |
| 4,626,637 | 12/1986 | Olsson et al. | 200/284 |
| 4,668,849 | 5/1987 | Sasaki et al. | 200/291 |
| 4,673,837 | 6/1987 | Gingerich et al. | 310/239 |
| 4,675,989 | 6/1987 | Galloway et al. | 29/622 |
| 4,697,863 | 10/1987 | Galloway et al. | 439/544 |

FOREIGN PATENT DOCUMENTS 2017348 10/1970 Fed. Rep. of Germany.

OTHER PUBLICATIONS

AMP Catalog 86-777, Revised 6-87, "Printed Circuit Board Switches and Shunts," pp. 1-2, 45-48; AMP Incorporated, Harrisburg, PA.

AMP Sales Bulletin, "The Patented 3500 Series Rotary Switch from AMP," AMP Incorporated, Harrisburg, PA.

Electronic Packaging & Publishing, Jun. 1986, "Resins and Tooling for Injection-Molded Circuit Boards," Frisch et al, Cahners Publishing Company (1986).

Primary Examiner—J. R. Scott
Attorney, Agent, or Firm—Anton P. Ness

[57] ABSTRACT

A rotor (100,200,300) for a stator (50) of a rotary switch (10) includes a substrate (106,216,302) having a continuous conductive surface over which a profiled dielectric layer (110,218,316) is molded which includes arcuate groove segments (118) along concentric circles which expose portions of the continuous conductive surface and define switch-encoding circuit paths (120,222,322) for brush contact portions (66) of the stator (50). The dielectric material at the ends (122) of each groove segment (118) deflect the brush contact portions (66) away from the conductive surface during rotation of the rotor (100,200,300), and the brush contact portions thus do not engage corner edges of discrete circuit paths. Each layer (110,218,316) can have an annular detent surface (132,134,324) of a plurality of pointed embossments (130,230,326) defining radial grooves (136,232,328) therebetween at switch locations, cooperable with detent means (74) of the stator (50) to accurately position the rotor (100,200,300) upon rotation. A method for making the rotor (100,200,300) includes variations for the conductive surface of the substrate to have electrically isolated inner (212,310) and outer (214,312) segments, where the inner segment (212,310) comprises the switch-encoding circuit paths (222,322) and the outer segment (214,312) underlies the detent surface (234,324) and enables electrical verification of the rotor attaining a switch position.

10 Claims, 6 Drawing Sheets

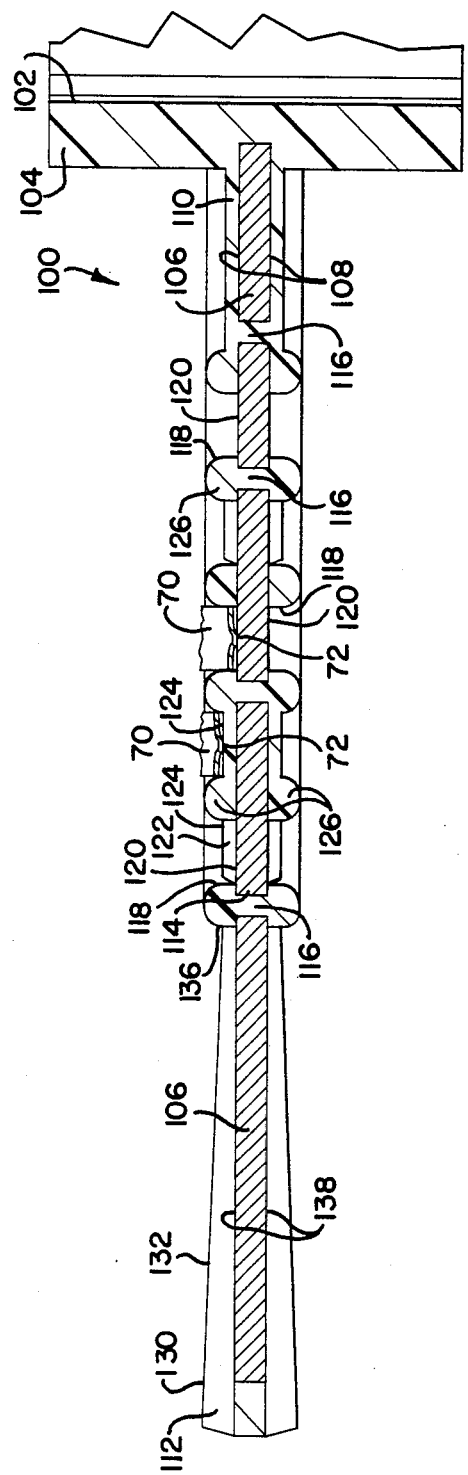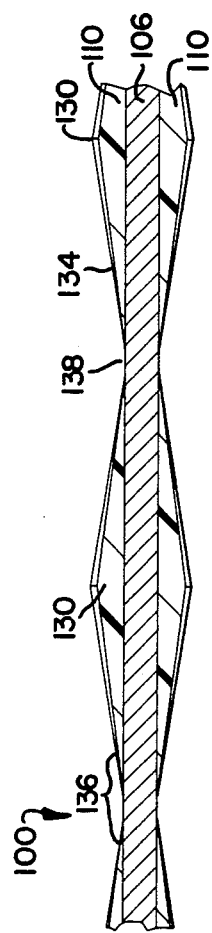
FIG. 4
FIG. 5

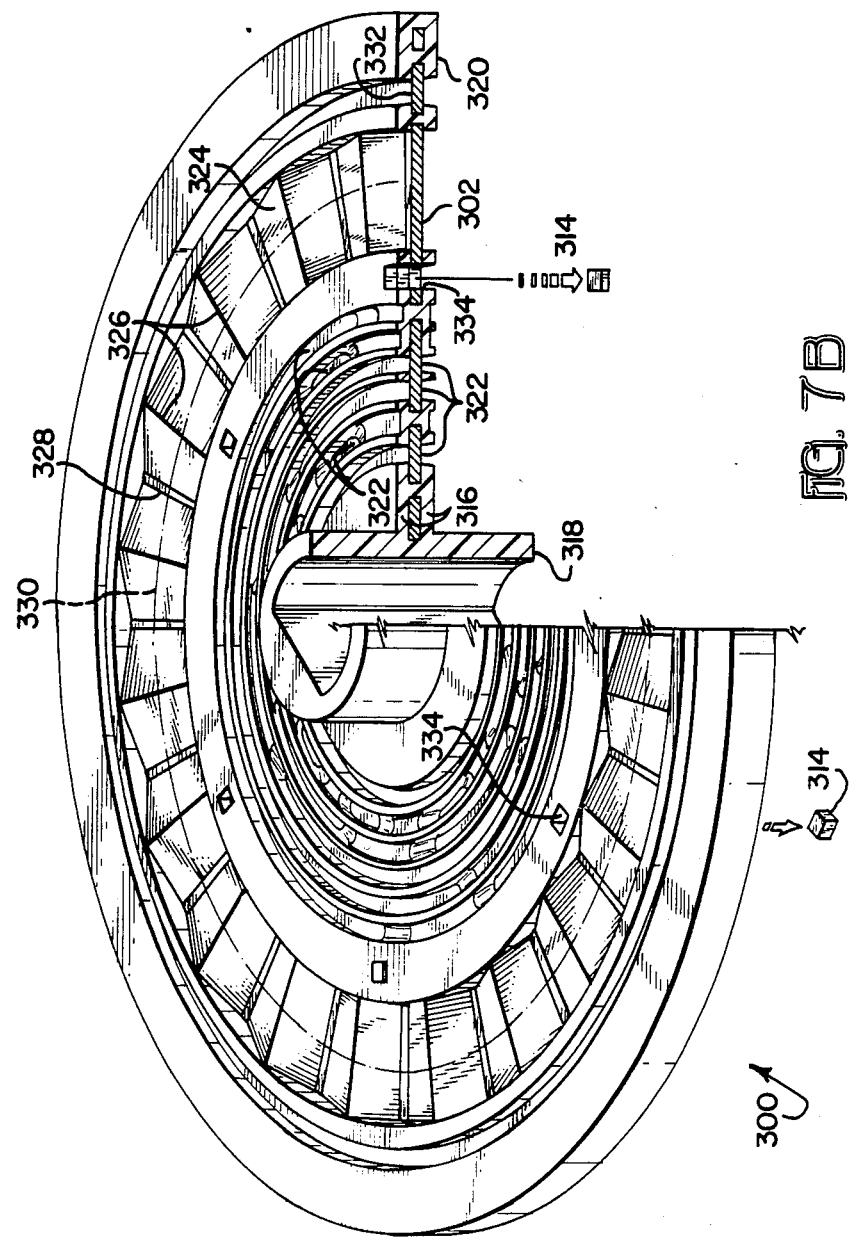

ENCODING SUBSTRATE FOR ROTARY SWITCH ASSEMBLY

FIELD OF THE INVENTION

The present invention relates to the field of electrical switches and more particularly to rotors for rotary switches.

BACKGROUND OF THE INVENTION

Certain rotary switch assemblies comprise a plurality of stators and associated rotors, wherein dielectric housing members comprising the stators are stacked together between end housing members and fastened together such as by bolts with nuts or rivets on their ends, with a central rotatable shaft extending through the assembly to rotate the rotors. Such a rotary switch is more particularly disclosed in U.S. Pat. No. 4,497,984 and is sold by AMP Incorporated under AMP Part No. 3-436209-4 for aircraft navigational systems. Each stator has a plurality of electrical terminals having outer contact sections extending outwardly from the assembly for electrical engagement with another article such as a printed circuit board, and the terminals have brush contact portions extending into a shallow cavity formed between adjacent pairs of housing members. A planar rotor member comprising a printed circuit board associated with the stator is disposed in the cavity thereof spaced from both adjacent housing members by bushings about a central opening through which the central shaft extends. The central shaft is profiled in cross-section and the central opening of each rotor is correspondingly profiled for the rotor to be rotated to a selected position thereby for coded electrical engagement between its circuit paths and free ends of spring arms of the brush contact portions of the associated stator. The central shaft is an assembly of an inner shaft independently rotatable within an outer shaft, each with a separate actuator or knob on the respective end thereof forwardly of the panel to which the switch is mounted; the outer shaft is associated with and rotates a forward group of rotors, while the inner shaft rotates a rearward group of rotors. The switch positions are determined by a detent system of detent-carrying wheels, one for the forward group of rotors and rotatable by the outer shaft, and another for the rearward group and rotatable by the inner shaft. Each wheel is disposed within a respective cavity of a housing of the switch, with the wheel for the forward group disposed in a forward end housing and the wheel for the rearward group disposed in a housing member centrally located along the stacked stators. An opposed pair of spring loaded ball detents are carried by each wheel which enter regularly spaced grooves around the inner surface of the cavity-defining wall of the associated end or central housing.

The active surface of the rotor utilized in AMP Part No. 3-436209-4 includes a pattern of arcuate conductive segments constituting the circuit paths which are disposed flush along the dielectric surface to minimize wear of the arcuate shaped free ends of the brush contact portions and the conductive material comprising the circuit paths, for longevity of the switch. Conventionally a circuit board rotor has been made by bonding a metal layer to a dielectric substrate; coating with an etchant resisting material, portions of the metal layer in the pattern of the desired configuration of circuit paths; applying etching solution to the metal layer to remove the uncoated portions of the metal layer, and then rinsing; and finally "backfilling" or filling with dielectric material the grooves left by etching away the metal, to provide a smooth surface to the circuit board.

It is desired to provide a circuit board rotor which is more economical and simpler to manufacture.

It is also desired to provide a rotor and stator combination wherein the brush contacts do not engage corner edges of the metal of the circuit paths especially during substantial in-service use.

It is further desired to provide a rotor which provides for its own positioning.

SUMMARY OF THE INVENTION

The present invention comprises a rotor having circuit paths engageable by free ends of spring arms of brush contact portions of a stator. In a first embodiment, the rotor consists of an essentially solid metal disc on the major sides of which are molded profiled layers of nonabrasive dielectric plastic material, with the molded layer of each active side having a pattern of grooves therein along concentric circles exposing selected portions of the metal disc thereby defining switch-encoding circuit paths. A bushing is molded to the disc integral with the plastic layers at the central aperture of the disc and which is profiled into a D-shape to be engaged by the central shaft of the switch assembly to rotate the rotor. The plastic layers of both sides are joined to each other by a plurality of integral columns through small apertures through the disc, by the bushing extending through the central disc aperture, and by an edge portion molded around the disc periphery. One of the path-defining grooves may be a continuous annulus, while the other path-defining grooves have an arcuate elongate shape of selected path length with the groove ends being tapered to comprise bearing surfaces for the brush contact free ends entering and leaving engagement with the metal surface in the groove during rotor rotation, while remaining within a shallow groove segment extending between exposed metal portions along the same circles. The path-defining grooves may be located in the interior portion of the rotor surrounding the central aperture, while the plastic layers at the outer region of the rotor may have detent surfaces profiled to include an annular array of radially extending pointed embossments having ramped sides and defining radial grooves regularly spaced around the rotor to define detent positions therearound, such as thirty-six grooves for a 36-position switch.

The associated terminals of the stator for the rotor of the present invention, have brush contact portions which include contact sections at the free ends to enter the relatively narrow path-defining grooves to engage the metal disc surface. The spring arms of the brush contact portions are adapted to permit the free ends to be deflected away from the metal disc surface by the plastic layer and remain under spring bias preferably in a shallow groove to re-enter the path-defining groove, when the rotor undergoes rotation. In such a switch assembly the circuit paths of the rotor are commoned in order to common all brush contacts of the stator which happen to be in engagement with respective circuit paths at a selected switch position. The stator also can include spring arms parallel to the brush contact portions at outer ends of the row thereof, to engage the rotor at the detent grooves under spring bias to urge the rotor to defined switch position.

In a second embodiment, the rotor of the present invention includes a rigid composite disc to both sides of which are molded the dielectric layers with profiled surfaces described above with respect to the first embodiment. The composite disc can comprise a rigid dielectric substrate on both sides of which are secured metal layers after which an annular gap in each layer is created to define electrically isolated inner and outer conductive segments on each side. The dielectric layers can then be molded thereover as before, joined by the central bushing, a peripheral joint, a plurality of column joints, and optionally by bonding to the underlying dielectric substrate in the annular gap. The outer conductive segment can be utilized for verification of rotor position by means of an intermittent circuit path comprised of exposed strips of the outer conductive segment at bottoms of radial grooves of the annular detent surfaces, in association with a continuous circuit path defined by an annular groove, being engaged by respective ones of a pair of brush contact spring arms following the continuous and intermittent circuit paths under spring bias, one of which is energized by an electrical current which can be sensed when the circuit is completed at a switch position.

In a third embodiment, wherein electrically isolated inner and outer conductive segments are provided as with the second embodiment, the rotor of the present invention includes a metal disc having inner and outer sections joined together at several severable sections spaced around the disc, with narrow elongate arcuate channels otherwise separating the sections, both the arcuate channels and the severable sections disposed about a single circle. The dielectric layers are molded thereto as before, preferably of an especially rigid wear-resistant plastic, and preferably leaving exposed the severable sections whereafter the severable sections are severed by a tool, and the plastic molded in the arcuate channels form column joints to provide a continuity of the rigidity necessary in a rotor across the eventually continuous annular gap in the metal of the rotor.

It is an objective of the present invention to provide a rotor by an economical manufacturing process which eliminates etching and backfilling.

It is a further objective to provide a rotor and stator combination wherein the brush contacts move from a position of engagement with respective circuit paths to positions of nonengagement therewith without engaging corner edges of the metal of the circuit paths.

It is yet a further objective to provide a rotor which has a detent surface profiled to include radial grooves cooperable with spring arms of an associated stator to urge the rotor into a defined switch position, and thus eliminate the necessity of separate detent members in a switch assembly and simplify assembly thereof.

It is still further an objective of the present invention to provide a rotor which includes means for electrically verifying accurate rotor positioning.

BRIEF DESCRIPTION OF THE DRAWINGS

FIG. 4 is an enlarged section view of several brush contacts disposed within path-defining grooves of the rotor of FIGS. 2 and 3.

FIG. 5 is an enlarged section view taken along lines 5—5 of FIG. 2.

FIGS. 7A and 7B are perspective views illustrating the forming of a third rotor embodiment.

DETAILED DESCRIPTION OF THE PREFERRED EMBODIMENT

Figure 1:
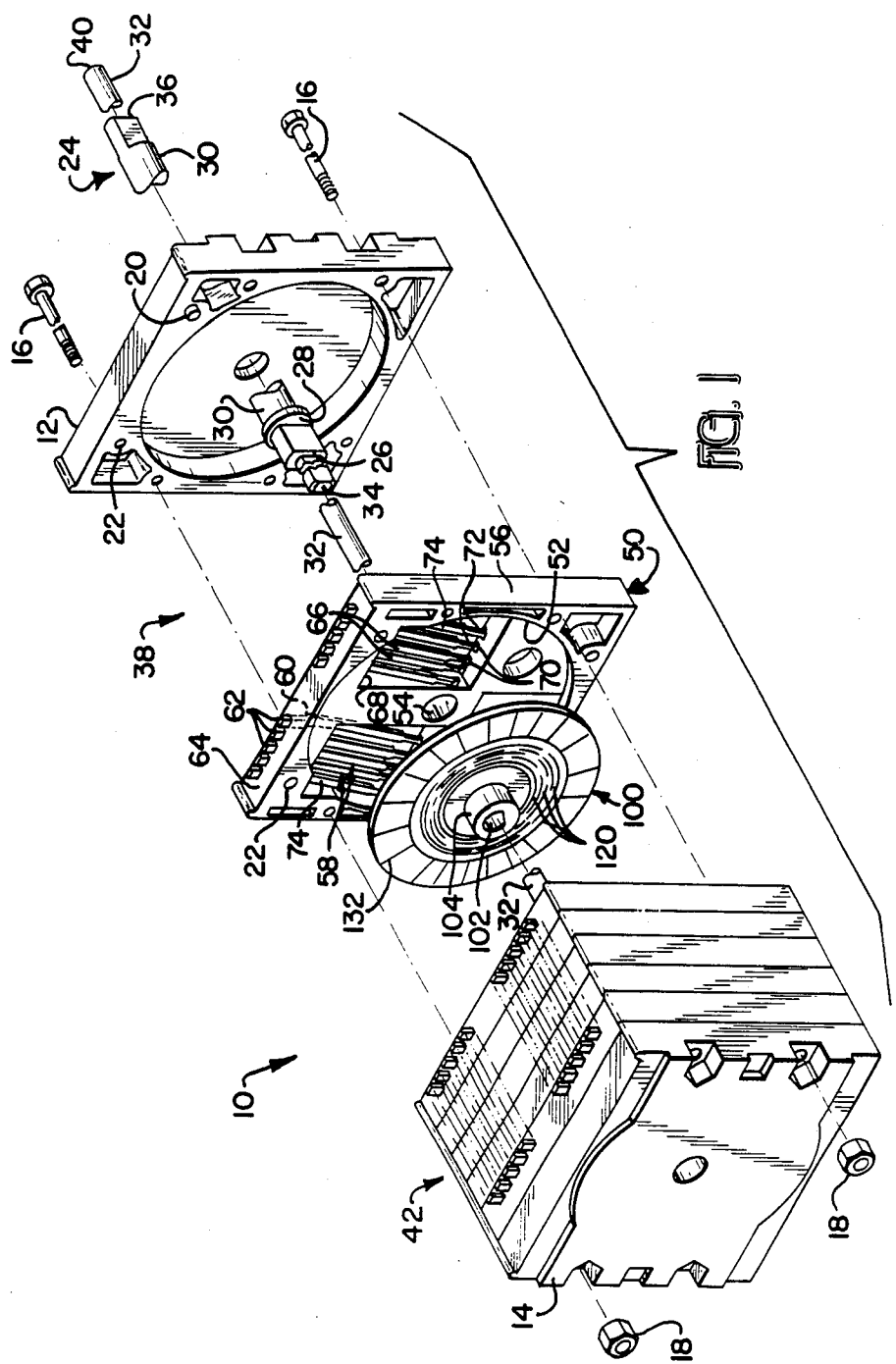
FIG. 1 is a perspective exploded view of a rotary switch containing the rotor of the present invention.

A rotary switch assembly 10 is shown in FIG. 1 having a plurality of stator subassemblies 50 stacked together, with one of a plurality of rotors 100 of the present invention shown spaced from an associated stator assembly 50. Each rotor 100 is disposed within a shallow cavity 52 of a stator 50, between its associated stator and either an adjacent stator or a housing, and includes at least one electrically active major side facing an associated stator. End housings 12,14 are disposed at opposed ends of the assembly, and a pair of bolts 16 extend through aligned holes in diametrically opposed corners of stators 50 and end housings 12,14 and secure together assembly 10 with nuts or rivets 18 on ends thereof. A second pair of bolts and nuts (not shown) can extend through aligned holes in the other corners to secure the switch to a panel. A series of cooperating projections 20 and holes 22 on end housings 12,14 and stators 50 maintain them in a proper oriented condition in assembly 10. Central shaft assembly 24 extends through assembly 10 through central apertures of stators 50, rotors 100, and end housing 12 to rotate the rotors 100 when actuated, while being unengaged with stators 50 and rotatable with respect to stators 50 and end housings 12,14.

Shaft assembly 24 has profiled rotor-engaging segments such as having a D-shaped cross-section, and central apertures 102 of rotors 100 have elongated bushings 104 which are correspondingly profiled to be engaged by the profiled rotor-engaging segments of shaft assembly 24. Bushings 104 are more particularly described in U.S. Pat. No. 4,497,984 and serve to increase the area of engagement with the profiled rotor-engaging segments of shaft assembly 24 axially therealong preventing wobble. Bushings 104 extend outwardly from the major sides of the rotors and freely through larger central apertures 54 of adjacent stator assemblies 50 to be disposed adjacent one another, thereby serving to appropriately space the rotors between adjacent stators 50 without engaging stators 50 and permit free rotation of rotors 100 within respective cavities 52. The bushings of the end rotors can be adjacent flanges or annular shoulders such as shoulder 26 of shaft assembly 24. Shaft assembly 24 includes a flange 28 disposed within end housing 12 to secure the shaft assembly to the switch assembly, with a far end disposed in a shallow central well (not shown) of end housing 14, all in a manner permitting rotation with respect thereto. Shaft assembly 24 may comprise an outer shaft portion 30 and an inner shaft portion 32 within bore 34 thereof and freely rotatable therewithin. Outer shaft portion 30 extends from an actuation end 36 having a knob element thereon (not shown) through the forward portion 38 of switch assembly 10 to the center, to rotate the rotors 100 in forward portion 38. Inner shaft portion 32 extends from actuation end 40 (with a separate knob element, not shown) entirely through switch assembly 10 to end housing 14 to rotate rotors 100 disposed in the rearward portion 42 of switch assembly 10.

Each stator assembly 50 comprises a dielectric housing 56 and a selected plurality of terminals 58 preferably arranged coparallel in a row, with housing 56 preferably molded over body sections 60 thereof. Terminals 58 can be stamped and formed on carrier strips to facilitate manufacturing, and after the molding step the carrier strips are severed, all of which is conventional. Terminals 58 have outer contact sections 62 extending outwardly from one of the sides of housing 56 comprising a mating face 64 to be engaged by corresponding contact means of another electrical article such as a printed circuit board (not shown). Terminals 58 have brush contact portions 66 extending into cavity 52 to engage circuit paths 120 of an associated rotor 100, and which are spring arms extending inwardly from outer wall 68 of cavity 52 and having arcuate or dimpled inner contact sections 70 on narrowed free ends 72 thereof.

With reference to the embodiment of FIGS. 2 to 5, each rotor 100 comprises a metal disc 106 on both side surfaces 108 of which are profiled dielectric layers 110 which are molded of plastic material to the disc and which are joined to each other. Bushing 104 is molded integrally with both layers 110 and serves to join them by extending through aperture 102. An integral peripheral portion 112 extends around the periphery of disc 106 and also serves to join layers 110 together. It may also be desirable, as shown in FIG. 4, to include several holes 114 through metal disc 106 through which integral columns comprising column joints 116 extend to join layers 110 together intermediate the periphery and the central aperture. If it is desired only to provide a profiled plastic layer on one of the major sides for a rotor having only one active side, a dielectric coating should be applied to the other major side to provide not only insulation but also physical structure to which the integral column joints join to help secure the active side's profiled layer to the disc and to anchor the portions thereof against lateral movement.

Dielectric layers 110 may be molded of a wear-resistant nonabrasive plastic such as unfilled nylon or such as liquid crystal polymer, an aromatic polyester material such as VECTRA (trademark of Celanese Corporation). Metal disc 106 may be made of, for example, a copper alloy such as beryllium copper or phosphor bronze or a copper tempered for appropriate rigidity. Disc 106 is preferably plated, for example, with silver or palladium, either prior to molding or even afterward, wherein the plastic material facilitates plating only of exposed areas of disc 106 by serving a masking purpose to conserve plating material. It is preferred not to use mold release material during the insert molding process and also not to use bonding agent between the metal and plastic in order to assure a clean conductive surface along the exposed circuit paths.

Figure 2:
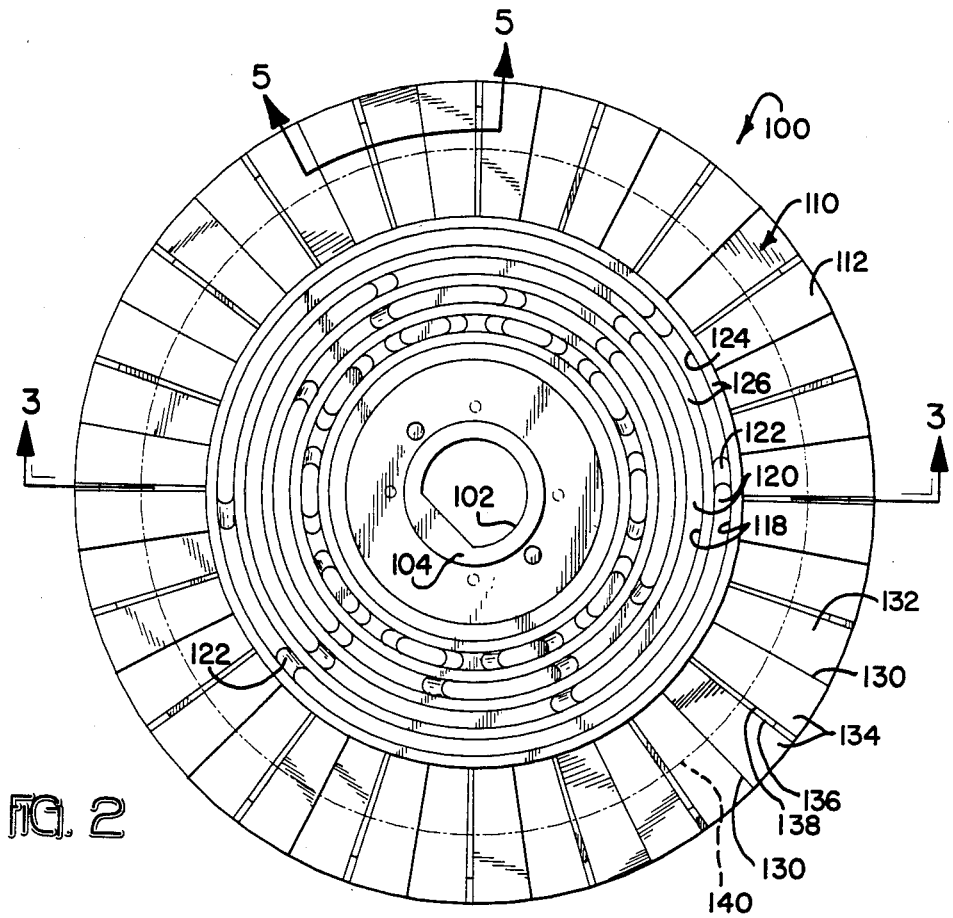
FIGS. 2 and 3 are perspective and cross-sectional perspective views of the rotor, with FIG. 3 taken along lines 3—3 of FIG. 2.
Figure 3:
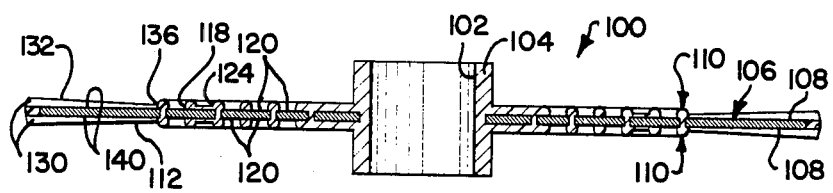

In the embodiment disclosed, referring to FIGS. 2 to 4, the major surfaces of both layers 110 are profiled, so that both sides of the rotor are active sides coacting with brush contact portions of stators on both sides. In the interior region about central aperture 102 are grooves 118 which expose surface 108 of metal disc 106 for a selected angular distance, thus defining switch-encoding circuit paths 120 to be engaged by contact sections 70 of brush contact portions 66 of an associated stator 50. It may be desired that one of circuit paths 120 be continuous around rotor 100, in which case it is preferred that the innermost circuit path be continuous for a radial extension of bushing 104 to provide the inner wall of the groove defining the continuous path.

At each end of each groove 118 are sloped surfaces or ramps 122 to facilitate entry and exit of a contact section 70, which is under spring bias against the rotor, into and out from groove 118 during rotation of rotor 100. Since the metal surfaces engaged by the contact sections are portions of a continuous metal surface, there are no metal surface discontinuities encountered by the contact sections as are commonly found with discrete metal circuit paths after substantial in-service use; and wearing of the contact sections is thus minimized. Circuit paths 120 are disposed along a plurality of circles concentric with central aperture 102; the circuit paths along each circle are selected to have arcuate lengths different from the lengths of the circuit paths of the other circles to provide coding for the switch. It may be desirable to provide shallow grooves 124 between leading and trailing ends of the circuit paths disposed along a particular circle to maintain free ends 72 of the associated brush contact portions aligned with those circuit paths. It is preferred to provide several column joints 116 within the interior region to anchor the substantially narrow plastic ribs defining groove walls 126 to metal disc 106 and prevent lateral movement with respect thereto.

In the exterior or peripheral region of plastic layer 110 the surface is profiled to have a plurality of low height pointed embossments 130 (FIG. 5) disposed in an annular array and comprising a detent surface 132. Each embossment 130 is preferably slightly higher at the outermost point and has sides which are long gently tapered ramps 134 extending radially to surface 108 of metal disc 106, defining radial grooves 136 at the bottoms of each of which is a narrow exposed radial strip 138 of surface 108 of metal disc 106. Strips 138 are located regularly around rotor 100 such as at 10-degree angular spacing for a 36-position rotary switch and comprise an intermittent circuit path 140. Referring to FIGS. 1 and 4, following intermittent circuit path 140 are free ends of outermost spring arms 74 of the row of aligned terminals 58 of the associated stator 50 which altogether define a detent system for the rotor and stator combination so that the rotor becomes positioned at a switch location.

It may be desirable in some rotor designs to place the detent surface in the interior region of the rotor, and the circuit paths in the peripheral region, with the associated stator appropriately modified. It may also be desirable in some rotor designs to profile the dielectric layer on the rotor's active side into a plurality of path-defining grooves, while profiling the dielectric layer on the other side into a detent surface.

Because outermost spring arms 74 are under spring bias, they exert a spring force against ramps 134 urging rotor 100 incrementally in the appropriate angular direction for the free end of the spring arm to reach the bottom of the groove. Since the outermost spring arms 74 of the several stator subassemblies 50 are aligned, the various rotors become appropriately positioned by the detent systems when rotated by either outer shaft portion 30 or inner shaft portion 32 of shaft assembly 24. The height of embossments 130 and hence the slope of ramps 134 for a given number of switch positions is limited by the depth of stator cavity 52 in which the rotor is required to be disposed, although relatively steep ramp slopes such as of 20 to 30 degrees may be preferable for detent system purposes where space permits.

It may be desirable to utilize spring arms 74 for positioning only: by removing the outer contact sections from the outermost terminals, they are rendered electrically inactive. In some embodiments of switches it may be desirable for the spring arms to be electrically active: by engaging exposed strip 138 of disc surface 108, the free end of spring arm 74 would provide verification that accurate positioning has been attained by completing an electrical sensing circuit with another of brush contact portions 66 engaging its respective switch-encoding circuit paths 120. In some embodiments of switches such as those having only one rotor and stator combination, it may be desirable to utilize the outermost two or more spring arms for positioning purposes. Also, it may be unnecessary to utilize detent systems in all of the rotor and stator combinations of a particular switch 10 and thus reduce resistance to actuating the switch, in which case spring arms 74 may be removed from a particular stator assembly 50 where the associated rotor would become properly positioned by the shaft assembly being effectively positioned by others of the rotors having operable detent systems.

In a particular switch assembly, it may be unnecessary to utilize all of the circuit paths of the rotor of the present invention, such as may be desired in a switch assembly having a plurality of rotor and stator combinations. While still using a single rotor construction, the stator can be modified easily, as is conventionally done, by removing a terminal from one or more particular positions along the carrier strip of terminals for a particular stator prior to the insert molding procedure, or even after the molding step, by severing the brush contact portion and the outer contact section from the body section. Thus one rotor construction of substantially a universal circuit path design can be used with several stator designs, eliminating the necessity of a plurality of different rotor parts and simplifying assembly.

Figure 6A:
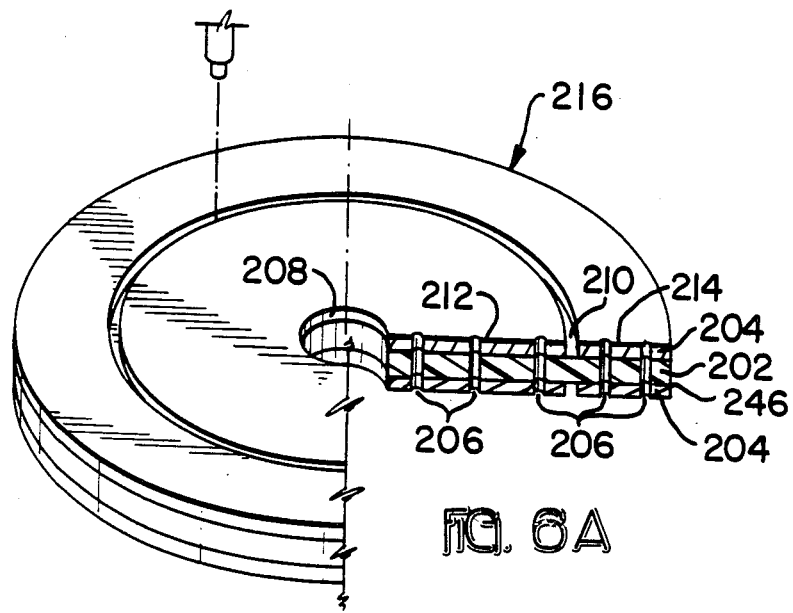
FIGS. 6A and 6B are perspective views illustrating the forming, and an enlarged cross-sectional view, of a second embodiment of rotor of the present invention.
Figure 6B:
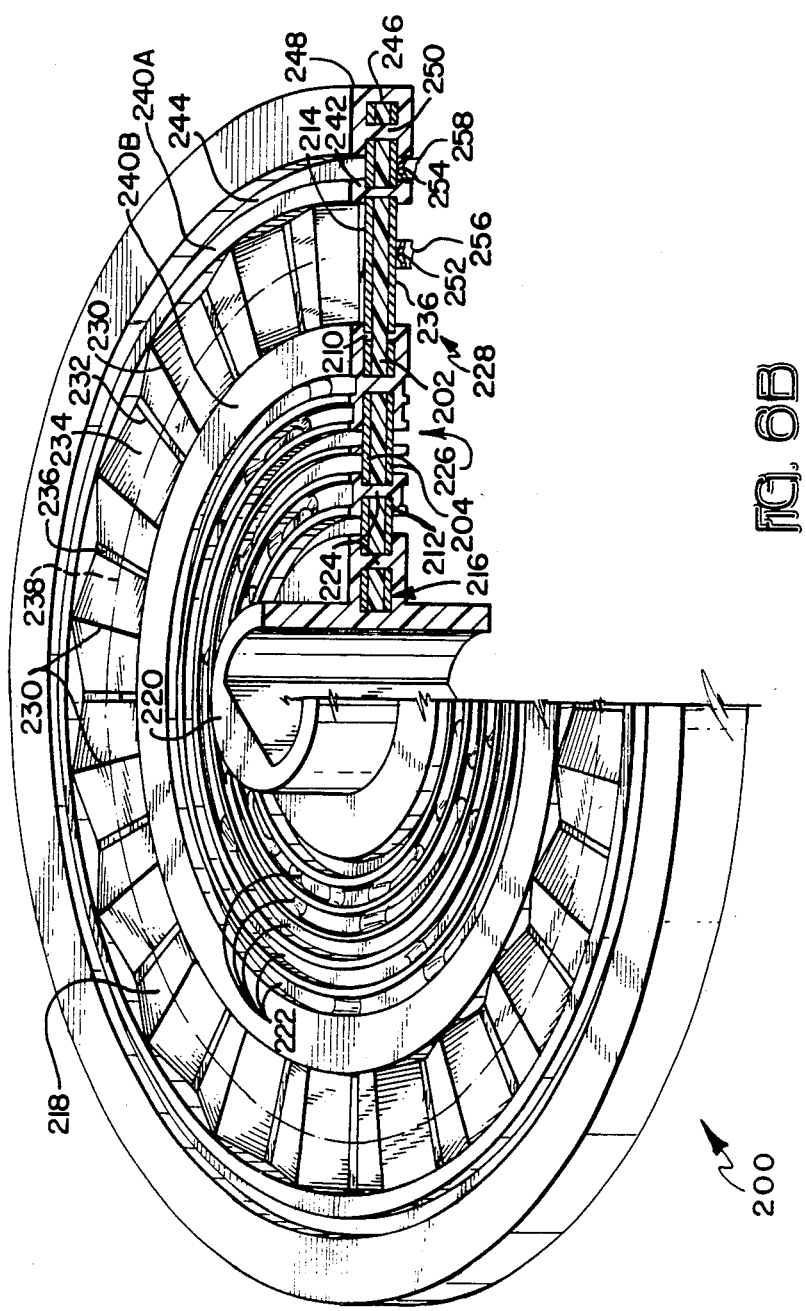

A second embodiment 200 of the rotor of the present invention is shown in FIGS. 6A and 6B. A dielectric substrate 202 has bonded or plated thereon metal layers 204 with a plurality of small holes 206 therethrough, and a central aperture 208. By using a laser beam an annular gap 210 is created around each metal layer extending to the dielectric substrate, providing an electrical discontinuity between inner metal segment 212 and outer metal segment 214, completing composite disc 216 of FIG. 6A. In FIG. 6B profiled plastic layers 218 are then molded to composite disc 216 to include bushing 220 and form switch-encoding circuit paths 222 and column joints 224 through holes 206 in the interior region 226 as in the first embodiment of FIGS. 2 to 5, with circuit paths 222 associated with inner metal segment 212.

In FIG. 6B, plastic layers 218 fill annular gaps 210 and may bond to the dielectric substrate of composite disc 216 at the gap bottom. In peripheral region 228 an annular array of regularly spaced low height pointed embossments 230 have radial groove segments 232 therebetween to define a detent surface 234 similar to that of the first rotor embodiment and expose narrow short strips 236 of outer metal segment 214, with strips 236 comprising an intermittent circuit path 238. It is preferred that a pair of annular plastic ribs 240A,240B interconnect the embossments 230 of the detent surface on each side of composite disc 216, and that the ribs on opposing sides be joined to each other by additional column joints 242 through holes 206 in composite disc 216. Around the outer annular rib 240A extends a continuous circuit path 244 comprising an exposed annulus of outer metal segment 214, and around the periphery of composite disc 216 and along peripheral edge surface 246 thereof is peripheral portion 248 joining the peripheral edges of plastic layers 218 and which is bonded to peripheral edge 246 and preferably additionally secured to composite disc 216 by several column joints 250.

Regarding the second rotor embodiment 200, a means is provided by the structure just described, for verifying the accurate positioning of the rotor by continuous outer circuit path 244 and intermittent circuit path 238 both being surfaces of outer metal segment 214. Contact sections 252,254 on free ends of a pair of adjacent associated spring arms 256,258 of an associated stator (not shown) relatively following continuous and intermittent circuit paths 244,238 can present an electrical signal to a sensor that a switch position has been attained, with a circuit being completed whenever the contact section 252 following intermittent circuit path 238 electrically engages a narrow metal strip 236 at the bottom of a radial groove 232 and an appropriate current level is applied via contact section 254 following and engaging continuous circuit path 244.

Figure 7A:
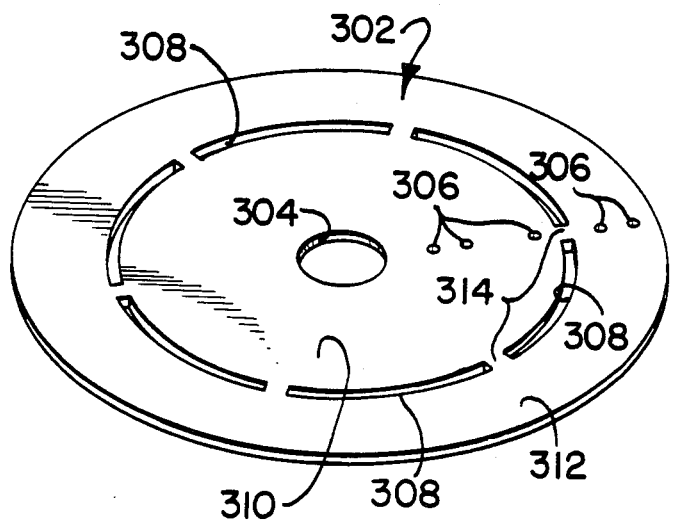

FIGS. 7A and 7B show a third embodiment 300 of the rotor of the present invention, and which is similar to the second embodiment in providing a means for verifying attainment of a switch position by providing a continuous circuit path and an intermittent circuit path, both being surfaces of an outer metal segment electrically separate from an inner metal segment which includes the plurality of switch-encoding circuit paths. A metal disc 302 is stamped having a central aperture 304, a plurality of small holes 306 therethrough, and a series of elongate arcuate apertures or channels 308 therethrough along a circle and defining an inner metal segment 310 and an outer metal segment 312. Inner and outer metal segments 310,312 are initially joined in FIG. 7A by severable sections or links 314.

In FIG. 7B metal disc 302 has had profiled plastic layers 316 molded on both sides, with layers 316 joined to each other by central bushing 318, peripheral portion 320, and a plurality of column joints extending through holes 306 and through arcuate channels 308. The interior region includes switch-encoding circuit paths 322 defined therein comprising exposed surfaces of inner metal segment 310, and the peripheral region includes a detent surface 324 of pointed embossments 326 and radial groove segments 328 and defines intermittent and continuous circuit paths 330,332 similarly to second rotor embodiment 200. It is preferred that plastic layers 316 include holes 334 extending to and exposing the surface of metal disc 302 at the locations of severable links 314. After molding of the plastic layers severable links 314 are punched out by appropriate tool means (not shown) received into holes 334 to electrically disconnect inner and outer metal segments 310,312 from each other. Column joints molded through arcuate channels 308 maintain the rotor as an integral article after links 314 are severed.

Although the rotor of the present invention has been especially adapted for use with a specific rotary switch assembly 10 illustrated in FIG. 1, the present invention of course is useful with rotary-switches of various kinds. Further, other designs of stators than stator 50 may be developed for use therewith, with a rotor modified for use therewith. Thus, while several embodiments of the rotor of the present invention have been described, variations thereof and other embodiments thereof may occur which are within the spirit of the invention and the scope of the claims.

What is claimed is:

1. A rotor for a rotary switch assembly, the rotor having at least one electrically active side, the rotary switch assembly including an actuation means for the rotor and further including a stator associated with the at least one electrically active side of the rotor, the stator including a plurality of terminals with respective brush contact portions adapted to be deflected under spring bias away from respective circuit path portions of the associated electrically active side of the rotor at least incremental distances, wherein the rotor is rotatably movable with respect to the associated at least one stator to any of a plurality of switch positions by the actuation means, the rotor comprising:

a substrate having at least a conductive surface along each major side desired to constitute an electrically active side, a profiled dielectric layer disposed over each said conductive surface, means securing said profiled dielectric layer and said substrate together, and means engageable by the actuation means of the switch assembly for rotation, each said profiled dielectric layer including a plurality of elongate arcuate groove segments along concentric circles exposing portions of said conductive substrate surface and thereby defining switch-encoding circuit paths engageable by contact sections of respective brush contact portions of the terminals of the associated stator, leading and trailing ends of each said groove segment being sloped to facilitate entry thereinto and exit therefrom of a said contact section under spring bias upon rotation of the rotor from one switch position to another by the actuation means of the switch assembly, whereby said switch-encoding circuit paths engaged by the brush contact portions of the stator terminals are portions of a continuous surface free of discontinuities proximate the circuit paths thus minimizing wearing of the brush contact portions during in-service use.

2. A rotor as set forth in claim 1 wherein said arcuate groove segments and switch-encoding circuit paths defined thereby are disposed in one of an interior region and a peripheral region of said profiled dielectric layer, and the other of said interior region and said peripheral region of said profiled dielectric layer includes an annular detent surface including a plurality of regularly spaced radially extending pointed embossments having sloped sides defining a like plurality of radial grooves engageable by at least one associated detent means of the associated stator under spring bias against said annular detent surface, comprising a detent system for accurately angularly positioning the rotor with respect to the stator upon rotation of the rotor from one switch position to another by the actuation means of the switch assembly.

3. A rotor as set forth in claim 2 wherein said annular detent surface is disposed in said peripheral region, and the portion of said conductive surface of said substrate underlying said peripheral region is an outer conductive segment electrically isolated from an inner conductive segment of said conductive surface of said substrate underlying said path-defining arcuate groove segments, said peripheral region is secured to said substrate and further includes a continuous annular groove adjacent said annular detent surface and exposing a continuous annular path of the surface of said outer conductive segment, and said radial grooves of said annular detent surface expose radial strips of the surface of said outer conductive segment and thereby define an intermittent circuit path, such that an electrical circuit is completed when contact sections of a pair of brush contact portions of additional terminals of the stator respectively following said continuous annular path and said intermittent circuit path simultaneously engage said outer conductive segment at a switch position when the rotor is rotated and is urged to the switch position by the detent means of the stator.

4. A rotor as set forth in claim 3 wherein said substrate comprises a conductive layer bonded to a dielectric substrate, said conductive layer having an annular gap formed therein electrically isolating said outer conductive segment from said inner conductive segment, prior to securing said profiled dielectric layer thereover.

5. A rotor as set forth in claim 3 wherein said substrate is a metal disc having an inner section initially joined to an outer section therearound only at a plurality of severable links disposed along a circle, and otherwise separated therefrom by a plurality of elongate arcuate channels along said circle, prior to securing said profiled dielectric layer thereover, after which said links are severed to disconnect said inner and outer sections and define said electrically isolated inner and outer conductive segments.

6. A rotor as set forth in claim 1 wherein said at least one profiled dielectric layer is molded over said substrate, said layer including molded integrally therewith a plurality of column joints extending through small holes through said substrate at selected locations to the other major side thereof and integrally joined to at least enlarged dielectric formations molded along said other major side, securing said at least one profiled dielectric layer to said substrate at said plurality of selected locations and anchoring portions of said profiled dielectric layer against lateral movement.

7. A rotor as set forth in claim 1 wherein both major sides are electrically active and profiled dielectric layers are molded on both said major sides and said profiled dielectric layers are integrally joined to each other at least by a plurality of column joints extending through holes through said substrate at a plurality of selected locations, securing said profiled dielectric layers to said substrate and anchoring portions thereof against lateral movement.

8. A rotor as set forth in claim 7 wherein peripheral edges of said profiled dielectric layers are integrally joined together along a peripheral edge surface of said substrate.

9. A rotor as set forth in claim 1 wherein said means for being engaged by the switch actuation means comprises a bushing portion integrally molded to said profiled dielectric layer along said at least one electrically active side and extending around and through a central aperture of said substrate and outwardly therefrom, engageable by a shaft means of the actuation means.

10. An encoding means for a rotary switch having a cooperating contact means on which are disposed a plurality of contact members engageable with encoding contact surface portions of the encoding means and relatively movable with respect thereto when one of the encoding and contact means is rotatably movable with respect to the other by an actuating means when the switch is actuated from one switch position to another while the other thereof is held stationary by the switch, the encoding means comprising:

a substrate having at least a conductive surface along each major side desired to constitute an electrically active side, a profiled dielectric layer disposed over each said conductive surface, means securing said profiled dielectric layer and said substrate together, and means permitting relative rotational movement of a cooperating contact means of a rotary switch associated with each said electrically active side, each said profiled dielectric layer including a plurality of elongate arcuate groove segments along concentric circles exposing portions of said conductive substrate surface and thereby defining switch-encoding circuit paths engageable by contact sections of respective brush contact portions of the contact members of the associated cooperating contact means, leading and trailing ends of each said groove segment being sloped to facilitate relative entry thereinto and exit therefrom of a said contact section under spring bias upon rotation of one of said substrate and said cooperating contact means when the actuating means of the rotary switch assembly is moved from one switch position to another, whereby said switch-encoding circuit paths engaged by the brush contact portions of the contact members of the cooperating contact means are portions of a continuous surface free of discontinuities proximate the circuit paths thus minimizing wearing of the brush contact portions during in-service use.

* * * * *